United States Patent Office 2,998,300
Patented Aug. 29, 1961

2,998,300
PROCESS FOR THE PREPARATION OF
CHROMIUM HEXACARBONYL
Ernst Otto Fischer, Munich-Solln, and Walter Hafner, Munich, Germany, assignors to Union Carbide Corporation, a corporation of New York
No Drawing. Filed Nov. 28, 1956, Ser. No. 624,737
Claims priority, application Germany Dec. 5, 1955
11 Claims. (Cl. 23—203)

The present invention relates to a process for the preparation of chromium hexacarbonyl.

Heretofore, chromium hexacarbonyl has been prepared by reacting chromic chloride with phenylmagnesium bromide and carbon monoxide in an ethereal solution. A carbon monoxide pressure of one atmosphere or somewhat higher was employed. This method requires the use of a large amount of solvent, the use of Grignard reagents, and is, therefore, impractical for technical preparation of chromium hexacarbonyl.

It is a prime object of the invention to provide a process for the preparation of chromium hexacarbonyl from starting materials which are technically easily accessible. Another object is to provide such a process wherein improved product yields are obtained and wherein isolation of the product is simplified.

Other aims and advantages of the invention will be apparent from the following description and the appended claims.

In accordance with the present invention, a process is provided comprising reacting a suitable anhydrous chromium halide compound, for example chromic chloride, with carbon monoxide in the presence of an aromatic solvent compound, a Friedel-Crafts catalyst of the metal halide type, and a suitable reducing agent under pressure at an elevated temperature. Subsequently, the chromium hexacarbonyl may be readily separated from the reaction mixture by sublimation. With chromic chloride as the chromium compound and aluminum as the reducing agent, the reaction proceeds according to the following equation:

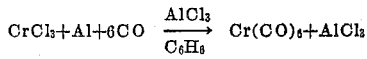

In place of chromic chloride, any halide of divalent and trivalent chromium may alternatively be employed.

It has been found that only small amounts of aromatic compounds are required for the reaction. Their catalytic activity is more significant than their function as the solvents. This is a further advantage of the process of the invention inasmuch as the utilization of space is very effective. It is advantageous to use aromatic compounds which are easily separable from the chromium hexacarbonyl due to their low boiling points or on the basis of other properties, such as benzene, toluene, xylene and the like.

Aluminum chloride can be used as the Friedel-Crafts catalyst; boron trifluoride, tin tetrachloride, titanium tetrachloride, zinc chloride, and other metal halide compounds can also be used. Any metal capable of reducing the chromium halide, especially aluminum, magnesium and zinc, can be used as the reducing agent. The process may be carried out without the addition of a Friedel-Crafts catalyst as such; if aluminum powder is used as the reducing agent the reaction with chromic chloride will yield in situ the required catalytic aluminum chloride.

A reaction temperature above 100° C. is desirable. The optimum reaction temperature for the system $CrCl_3$, Al, $AlCl_3$ and $C_6H_6$ is approximately 140° C.

Chromium hexacarbonyl, which has become technically easily accessible by the above method, is useful in serving as a decomposable material in the production of metallic coatings, such as for mirrors, as a catalyst and as a chemical intermediate.

In an example of the process of the invention, a rotating autoclave, equipped with a glass lining and having a volume of 40 milliliters, was charged with the following amounts of reagents: 1 gram of anhydrous chromic chloride, 1 gram of aluminum powder, 0.5 gram of finely-divided, anhydrous aluminum chloride and 5 milliliters of benzene. The vessel was pressurized with between 150 to 200 atmospheres of carbon monoxide, and was then heated to a temperature of 140° C. for 15 hours. After cooling and burning off the excess carbon monoxide, the whole reaction mixture was transferred into a sublimator. Chromium hexacarbonyl was sublimed in vacuum. The yield was 1.15 grams chromium hexacarbonyl, corresponding to 83% of the theoretical yield.

What is claimed is:

1. A process for the preparation of chromium hexacarbonyl which comprises reacting at an elevated temperature (1) an anhydrous chromium halide, (2) a metallic reducing agent selected from the group consisting of aluminum, magnesium and zinc, (3) a solvent-catalyst selected from the group consisting of benzene and lower alkyl-substituted benzenes, (4) a Friedel-Crafts catalyst selected from the group consisting of aluminum halides, boron trifluoride, tin tetrachloride, titanium tetrachloride and zinc chloride and (5) carbon monoxide under pressure.

2. Process in accordance with claim 1 wherein said chromium halide is chromic chloride.

3. Process in accordance with claim 1 wherein said metallic reducing agent is aluminum.

4. Process in accordance with claim 1 wherein said solvent-catalyst is benzene.

5. Process in accordance with claim 1 wherein said solvent-catalyst is toluene.

6. Process in accordance with claim 1 wherein said solvent-catalyst is xylene.

7. Process in accordance with claim 1 wherein said Friedel-Crafts catalyst is aluminum chloride.

8. A process for the preparation of chromium hexacarbonyl which comprises reacting at a temperature above about 100° C. anhydrous chromic chloride, aluminum powder, benzene, anhydrous aluminum chloride and carbon monoxide under pressure.

9. Process in accordance with claim 8 wherein said temperature is about 140° C.

10. Process in accordance with claim 8 wherein said carbon monoxide pressure is at least about 150 atmospheres.

11. A process for the preparation of chromium hexacarbonyl which comprises reacting at an elevated temperature (1) an anhydrous chromium halide, (2) aluminum powder, (3) a solvent-catalyst selected from the group consisting of benzene and lower alkyl-substituted benzenes, (4) a Friedel-Crafts catalyst produced in situ by the reaction of said chromium halide and said aluminum powder, and (5) carbon monoxide under pressure.

References Cited in the file of this patent
UNITED STATES PATENTS 2,554,194  Hurd ------------------ May 22, 1951
2,803,525  Brimm et al. ------------ Aug. 20, 1957

FOREIGN PATENTS 520,221  Germany -------------- Mar. 16, 1931

OTHER REFERENCES

Jour. of American Chem. Society (July 1947), pages 1723–1724.
Chem. Abs. 49, 5185(d).
Mond: "The Metal Carbonyls," Jour. of the Soc. of Chem. Industry (June 1930), pages 271T to 278T.